(12) United States Patent
Lee et al.

(10) Patent No.: US 7,702,751 B1
(45) Date of Patent: Apr. 20, 2010

(54) METAPORTAL SYSTEM AND METHOD

(75) Inventors: Wing Lee, Overland Park, KS (US); Sei Ng, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1375 days.

(21) Appl. No.: 10/745,197

(22) Filed: Dec. 23, 2003

(51) Int. Cl.
*G06F 15/16* (2006.01)
(52) U.S. Cl. ........................................... 709/219
(58) Field of Classification Search ......... 709/217–219, 709/201
See application file for complete search history.

(56) References Cited

U.S. PATENT DOCUMENTS

| | | | |
|---|---|---|---|
| 6,621,502 B1 * | 9/2003 | Nair et al. .................... | 715/716 |
| 6,760,746 B1 * | 7/2004 | Schneider .................... | 709/203 |
| 7,003,526 B1 * | 2/2006 | Lee et al. .................... | 707/102 |
| 7,370,011 B2 * | 5/2008 | Bennett et al. ................ | 705/39 |
| 2002/0169852 A1 * | 11/2002 | Schaeck ..................... | 709/218 |
| 2003/0163513 A1 * | 8/2003 | Schaeck et al. ............. | 709/201 |
| 2004/0030795 A1 * | 2/2004 | Hesmer et al. .............. | 709/231 |

\* cited by examiner

*Primary Examiner*—Ario Etienne
*Assistant Examiner*—Hee Soo Kim

(57) ABSTRACT

A system for accessing a plurality of portals is provided. The system includes a user interface, a back office system maintaining information, and a first portal coupled to access at least a portion of the back office system. The first portal having a first portal user interface to enable a user to access at least portions of the information of the back office system. The system includes a second portal having a second portal user interface, and a metaportal in communication with the first and second portals and the user interface, the metaportal is operable to collect at least a portion of the first and second portal user interfaces for display via the user interface to enable the user to access at least a portion of the information maintained by the back office system. A method for migrating from disparate portals to the metaportal is also provided.

27 Claims, 1 Drawing Sheet

METAPORTAL SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates generally to the access and transfer of data between a client system and disparate interface portals to back office systems. More specifically, a metaportal is provided that facilitates the access and transfer of data by providing an aggregate portal to the disparate interface portals.

BACKGROUND OF THE INVENTION

In a large enterprise with multiple diverse computing systems, it is sometimes desirable to have an interface through which certain application or functions of the computing systems may be accessed. This interface, or portal, to the computing systems may provide access to information stored within the computing systems to the client system. For example, a company might have different customer portals for all the provided services, such as long distance service, local service and wireless service. Each customer portal provides the customer information, such as subscription plan, current and past billing data, etc.

When a client system wants to make use of the functions of a particular set of computing systems, the client system must access the portal to that computing system. As different groups of computing systems may operate independently of one another, the client system may need to access a different portal for each computing system. For example, a client system may need to access one portal to request the activation of a new service, and then access a second portal to receive billing information on a different service. Such disparate portals and back office computing systems commonly result as a result of corporate mergers or acquisitions.

SUMMARY OF THE INVENTION

An embodiment of the metaportal provides a system by which a user interface may be used by a client system to access a plurality of portals. This portal to portals, or metaportal, allows the client system to access a first portal coupled to at least a portion of a first back office system. The first portal has a first user interface, operable to give a user access to the first back office computing system. The metaportal also allows the client system to access a second portal. The second portal has a second user interface. The second portal may couple to a different portion of the first back office. It may also couple to at least a portion of a second back office system. The metaportal communicates with the first and second portals, and is operable to collect at least a portion of the user interfaces of the first and second portals. The metaportal is operable to display via the metaportal user interface the collected portions of the user interfaces of the first and second portals. The metaportal is further operable to allow the user access to at least a portion of the information maintained by the back office system.

An embodiment of the metaportal may also provide a user interface through which a client system may access user services information. User services information may reside in a first back office system, and may be retrieved and accessed through the user interface of a first portal. User services information may also reside in a second back office computing systems, with a user interface for a second portal provided to retrieve and access information from these systems. The metaportal includes a collection component which communicates with both the first portal and with the second portal. The collection component is operable to collect at least a portion of the portal user interface for display via the user interface of the metaportal. The collection component is further operable to enable a user to access the user services information.

A preferred embodiment of the metaportal may provide a method to migrate portals. Data is contained with a first back office computing system, and accessed by a first portal couples to the first back office computing system. The metaportal is operable to access the user interface of the first portal and display the accessed information in a metaportal user interface. The metaportal is operable to couple to back office computing systems. The metaportal accesses the back office computing systems directly by the coupling. The metaportal may then display the information from the back office computing systems in the metaportal user interface.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

Figure 1:
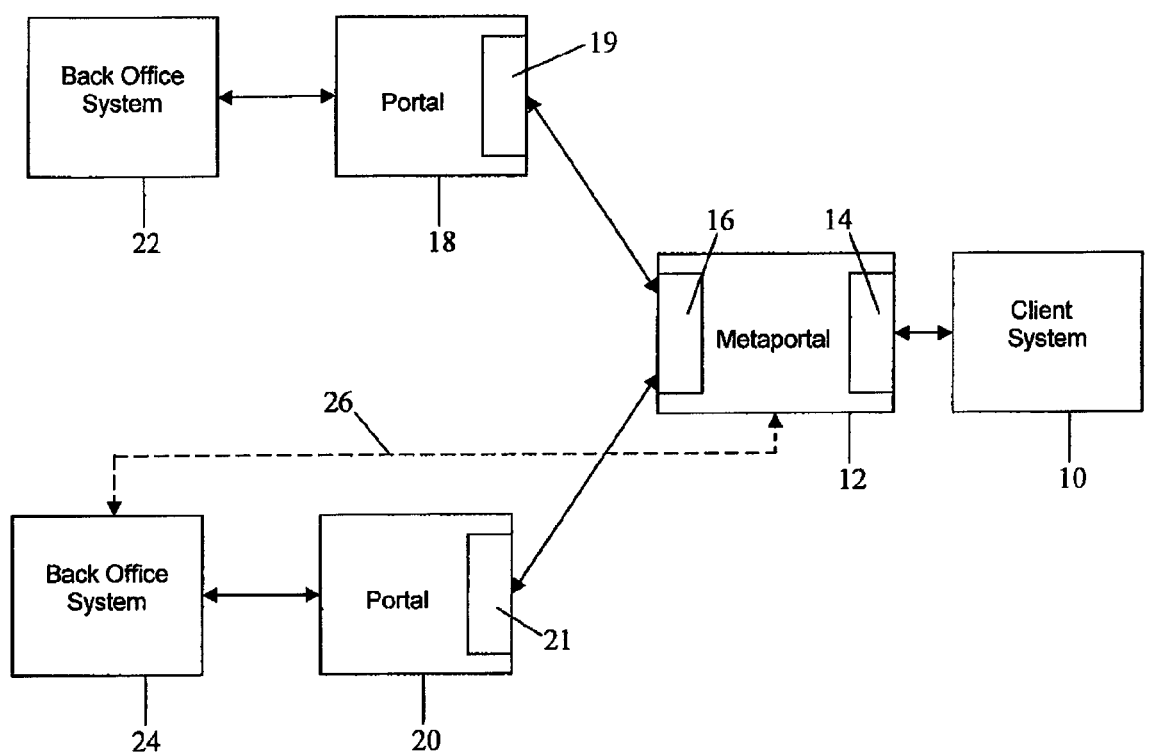
FIG. 1 is a block diagram depicting an embodiment of a metaportal system of communication between a client system and a user interface system connecting to a plurality of user interface portals.

It should be understood at the outset that although an exemplary implementation of one embodiment of the present system is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

FIG. 1 shows a system 11 for implementing an embodiment of a metaportal 12. In an embodiment, the metaportal may be a software application that may be stored on a non-transitory computer readable storage medium and executable by a processor, as would be understood by those of ordinary skill in the art. The metaportal 12 provides a user interface 14 to which a client system 10 may couple. The user interface 14 may, in one embodiment, be constructed with hyper-text markup language (HTML). In another embodiment, the user interface 14 may use extensible hyper-text markup language (XHTML) or may use dynamic hyper-text markup language (dHTML). The client system 10 may take the form of a web browser such as NETSCAPE from NETSCAPE COMMU- NICATIONS CORPORATION, based in Mountain View, Calif. or such as INTERNET EXPLORER from MICROSOFT CORPORATION, based in Redmond, Wash. The client system 10 may communicate with the user interface 14 through a transmission control protocol/internet protocol (TCP/IP) connection making use of the hyper-text transfer protocol (HTTP).

The metaportal 12 contains a collection component 16 operable to communicate with a first portal 18 and operable to communicate with a second portal 20. In an embodiment, the first portal may be a software application that may be stored on a non-transitory computer readable storage medium and executable by a processor and the second portal may also be a software application that may be stored on a non-transitory computer readable storage medium and executable by a processor, as would be understood by those of ordinary skill in the art. The first portal 18, in one embodiment, communicates with a least a portion of a first back office computing system 22. The first back office computing system 22 may include, but is not limited to, one or more groups or clusters of systems such as a billing system, an ordering system, a provisioning system, a customer information database, and an inventory database. A user interface 19 for the first portal 18 is operable to access the first back office computing system 22 using techniques such as Java Remote Method Invocation (RMI) and Internet Inter-ORB Protocol (IIOP). The user interface 19 of the first portal 18 allows users to access the first back office computing system 22, for example, in a manner typically used by portals for these purposes.

The first portal 18 may retrieve data from the first back office computing system 22. The first portal 18 may also submit data to the first back office computing system 22. This data may, for example, include records regarding a customer's bill, a new order for service, a change in a provisioned system, and updates to a customer's records. The first portal 18 may perform an action with the first back office computing system 22, such as payment of a customer's bill, ordering a new service, and selecting a service option. The second portal 20 and a second back office computing system 24 operate in construction and function in a manner substantially similar to the first portal 18 and the first back office computing system 22, respectively.

The collection component 16 of the metaportal 12 is operable to collect at least a portion of the information provided by the user interface 19 of the first portal 18. In one embodiment, the first portal 18 may be constructed with hyper-text markup language (HTML), and/or may contain information programmed using a variety of programming languages and techniques known in the art. The collection component 16 accesses the first portal 18 to gather at least a portion of the HTML or other language data from the user interface 19 of the first portal 18. The collection component 16 is operable to gather, for example, web-based interface information and data without searching or accessing the databases of the first back office computing system 22. It will be appreciated that this non-complex coupling of the collection component 16 with the first portal 18, via the user interface 19, may be accomplished without detailed knowledge or understanding of the databases or other systems of the first back office computing system 22 and eliminates complex programming and/or integration which might otherwise be required. The metaportal 12 operably incorporates elements of this data into the user interface 14. The client system 10 may access the data through the user interface 14 of the metaportal 12.

In one embodiment, the first portal 18 may provide a plurality of selectable preferences, such as billing cycles, delivery methods, and contact availability. The user interface 19 of the first portal 18 may present these preferences in a manner which allows for the user to select from the options presented, using such techniques, for example, as drop down menus, buttons, and toggles. The metaportal 12 is operable to select at least a portion of these preferences through the use of the collection component 16. The client system 10 may access these preferences, and make selections of these preferences, through the user interface 14 of the metaportal 12. After the client system 10 has accessed and selected these preferences, the metaportal 12 then use the collection component 16 to transmit the preferences selected to the first portal 18. The first portal 18 transmits the preferences selected to the first back office computing system 22. The user interface 19 for the first portal 18 reports the response from the first back office computing system 22, and the collection component 16 gathers this response. The metaportal 12 uses the user interface 14 to display the response to the client system 10.

The collection component 16 of the metaportal 12 operates in construction and function to collect, by a non-complex coupling such as that described above, at least a portion of a user interface 21 of the second portal 20 in a manner substantially similar to the way the collection component 16 collects at least a portion of the user interface 19 of the first portal 18. The second portal 20 couples with the second back office computing system 24, operating in construction and function in a manner substantially similar to the first portal 18 and the first back office computing system 22, respectively. While two portals and two back office computing systems are shown in FIG. 1, other quantities of portals and back office computing systems could be present.

Absent the metaportal 12, the client system 10 obtains access to resources or information from the first back office computing system 22 via the user interface 19 of the first portal 18. Likewise, the client system 10 would otherwise access resources or information from the second back office computing system 24, via the user interface 21 of the second portal 20. The metaportal 12 provides an efficient system for the client system 10 to access multiple different portals and their respective back office computing systems.

Without the metaportal 12, accessing the back office computing systems 22 and 24 is inefficient for various reasons. For example, the user interface 19 of the first portal 18 and the user interface 21 of the second portal 20 may have different formats, requiring the client system 10 to access the back office systems 22 and 24, respectively by different manners. Also, some of the information required by each portal to access the back office systems 22 and 24 may be redundant. For example, the client system 10 may be required to provide a different means of authentication for each portal 18 and 20. Another drawback to this method results from the inability to update overlapping or duplicate information used or stored by the back office computing systems 22 and 24 simultaneously. For example, the client system 10 may need to access a different billing system for two different kinds of services offered, and update both with new information, such as a new shipping address. The existing method and technology requires the client system 10 to access the first portal 18 and the second portal 20 separately, authenticate separately, update the back office systems 22 and 24 separately, and receive confirmation separately. Furthermore, due to design differences in the user interfaces 19 and 21, navigation and use of the first and second portals 18 and 20 may be considerably different from the view point of a user of the client system 10.

The metaportal 12 allows the client system 10 to easily and efficiently access both the first back office computing system 22 and the second back office computing system 24. A programmer of the portal or user using the client system 10 benefits by only having to learn the user interface 14 instead of both the first portal 18 and the second portal 20. The use of the metaportal 12 may allow a company to present a single integrated front end system to their customers with less development time than might otherwise be required for the creation of a new portal which integrates the function of both the first portal 18 and the second portal 20.

In one embodiment, the metaportal 12 provides an integrated system for use by customers and clients with substantially less cost than development and deployment of a new portal may require. A portion of the ease and speed for development for the metaportal 12 derives from the limited requirements needed to develop the metaportal 12. In one embodiment, to develop the metaportal 12 from an existing first portal 18 and second portal 20 requires only an understanding of the user interfaces 19 and 21 presented by the portals 18 and 20, and does not require an analysis or replacement of the coupling between the first portal 18 and the first back office computing system 22, nor of the coupling between the second portal 20 and the second back office computing system 24.

When gathering data from the first portal 18 and the second portal 20, the collection component 16 may retrieve only a textual information from the user interface 19 of the first portal 18 and from the user interface 21 of the second portal 20. The collection component 16 of the metaportal 12 may also be operable to retrieve only user data from the user interfaces 19 and 21 of the portals 18 and 20. In another embodiment, the collection component 16 may also retrieve other data from the user interfaces 19 and 21, including, but not limited to, graphics, images, binary data, and programs. The collection component 16 may repeat the collection process from the first portal 18 and the second portal 20 each time the client system 10 accesses the user interface 14 of the metaportal 12. In still another embodiment, the collection component 16 may store this information in a cache local to the metaportal 12, providing the information from the cache to the user interface 14 for display each time the client system 10 accesses the user interface 14 of the metaportal 12. Such a cache may be used to store such elements as graphics, images, binary data, programs, and other such data as may prove commonly used by the metaportal 12. The use of the cache local to the metaportal 12 may decrease the access time required for the client system 10, which may prove useful when access to the first portal 18 or the second portal 20 suffers from delay as a result of such factors as, for example, a slow connection between the collection component 16 and the portals 18 or 20, and heavy load on the portals 18 or 20.

The collection component 16 may in a preferred embodiment gather the HTML from the user interface 19 of the first portal 18 by using the hyper-text transfer protocol (HTTP). The collection component 16 may, for example, gather the entirety of the portals 18 or 20. The collection component 16 may also be used to gather only such portions of the portals 18 or 20 as may prove useful to display for the user interface 14. The metaportal 12 may include the collection component 16 as an integrated component. The collection component 16 may make also take the form of a software component such as, for example WEBLOGIC by BEA SYSTEMS, INC. of San Jose, Calif., and WEBSPHERE by INTERNATIONAL BUSINESS MACHINES CORPORATION of Armonk, N.Y.

The collection component 16 may alter the data gathered from the user interfaces 19 and 21 of the portals 18 and 20. The collection component 16 may use an internal software component to make the alteration, or may call on an external source to make the alteration. Such external sources may include for example scripts written in a language such as Perl or python, filtering software, language translation software, and other such programs. This alteration may remove extraneous information such as, for example, HTML header information specific to the user interfaces 19 and 21, and background images used in the user interfaces 19 and 21. The removal of such extraneous information may prove useful to increase the efficiency of the function of the metaportal 12, and it may reduce the amount of information the metaportal 12 needs to process before sending the information to the user interface 14.

The alteration of the data gathered by the collection component 16 may add information. The information added by the collection component 16 may allow the user interface 14 of the metaportal 12 to follow a uniform standard for all elements of the aggregate collected data. The uniform standard followed by the user interface 14 allows the generation of a uniform look and feel for the user interface 14 separate from that of the user interfaces 19 and 21 for the portals 18 and 20. The uniform standard used, in one embodiment, may make use of Cascading Style Sheets (CSS), a simple styling language which allows attaching style to HTML elements. The uniform standard may also involve translation of the data elements found in the portals 18 and 20 or in the user interfaces 19 and 21. The user interface 14 may take advantage of the uniform standard to reduce repetition of common information sent to and requested from the client system 10, such as the name used by the client system 10. In an embodiment, the user interface 14 of the metaportal 12 may combine elements from the first portal 18 and the second portal 20 which duplicate or overlap one another into a single element. For example, the metaportal 12 may combine the elements representing the billing address from the first portal 18 and from the second portal 20 into a single element presented by the user interface 14 of the metaportal 12 to the client system 10.

The metaportal 12 may also include functions to provide enhanced operation to the client system 10. For example, when accessing both the first portal 18 and the second portal 20 through the metaportal 12, an embodiment of the metaportal 12 may provide a uniform authentication method, reducing the need for the client system 10 to repeatedly authenticate separately with both portals 18 and 20. The metaportal 12 may also provide a caching function to keep information regarding the client system 10 for use by the first portal 18 and the second portal 20. Such a caching function might allow the metaportal 12 to store elements, such as the web browser cookie, which provide information about the connection and the session. This improves the ease with which the metaportal 12 may access the first portal 18 and the second portal 20 for the client system 10.

The metaportal 12 provides a method for migrating a collection of disparate portals requiring independent access to a single standard access provided by the user interface 14 without requiring a migration of existing infrastructure. By avoiding the migration of existing infrastructure, development time may be reduced, no or less additional hardware may be required than would a complete migration, and legacy systems may be accessed via the standard methods used for current systems prior to the legacy systems integration with current systems. The metaportal 12 also allows a migration to an integrated portal system to improve performance without requiring a change in the manner in which the client system 10 makes use of the user interface 14.

One embodiment of this method of migration to an integrated portal system begins with the configuration shown in FIG. 1 and described above, with the client system 10 accessing the user interface 14 of the metaportal 12. The metaportal 12 uses the collection component 16 to access the first portal 18 and the second portal 20. The metaportal 12 is made operable to couple directly with the second back office computing system 24, as shown by a dashed line 26 connecting the metaportal 12 with the second back office computing system 24. The connection of the metaportal 12 directly with at least a portion of the second back office computing system 24 may be more a more complex coupling than the coupling of the metaportal 12 to the first portal 18. Such a complex coupling may require a more detail understanding, for example, about the systems, sub-systems, and databases of the second back office computing system 24 to integrate or develop programs to interface with the second back office computing system 24. The metaportal 12 may be made operable to couple directly with the second back office computing system 24 by the addition of at least some portion of the portal functions of the second portal 20. The process of coupling the metaportal 12 with the second back office computing system 24 may be simplified where the second portal 20 follows a standard format for such elements as aggregation, personalization, presentation and security. Such a standard format reduces the amount of time needed for the development of the portal functions for inclusion in the metaportal 12. Examples of such standardized formats include, but are not limited to, the JSR-168 Portlet Specification as defined by the Java Community Process, sponsored by SUN MICROSYSTEMS INC of Palo Alto, Calif., and presented at <http://www.jcp.org/en/jsr/detail?id=168>.

Even while developing a direct connection to the first back office computing system 22, the metaportal 12 continues to be able to access the second back office computing system 24 by using the collection component 16 to access the second portal 20. When development of the portal function for the metaportal 12 is completed, the metaportal 12 is coupled to the second back office computing system 24 and the client system 10 continues to use the user interface 14 of the metaportal 12. The metaportal 12 continues to access the first back office computing system 22 through the first portal 18. However, the metaportal 12 now couples directly with the second back office computing system 24 without requiring use of the second portal 20. No change in action or operation of the client system 10 is required during this migration.

After coupling directly with the second back office computing system 24, the metaportal 12 is operable to perform at least a selection of the same functions as the second portal 20. The metaportal 12 may retrieve data from the second back office computing system 24. The metaportal 12 is operable to display the data retrieved from the second back office computing system 24 through the user interface 14 to the client system 10. The metaportal 12 may also be operable to transfer data received from the client system 10 to the second back office computing system 24. Migration according to this technique allows the user to continue to use the same user interface 14, while improving the performance of the metaportal 12 when accessing the second back office computing system 24. After deployment of the portal function for the metaportal 12 in this migration, the second portal 20 may be decommissioned. In some cases, migration may or would be continued to included the first back office computing system 22, or other portals, or could be stopped or continued based on evaluations of efficiencies and the efforts expended for the migration.

It will be appreciated that numerous migration scenarios are anticipated by the present disclosure as alternatives to complete migration from the metaportal 12 to various back office systems. For example, the metaportal 12 may be coupled or have access to, such as by building direct access, only portions or sub-systems of certain back office systems, while the metaportal 12 is completely integrated with other back office systems and clipping, via a portal interface as described above, from still other back office systems. Another alternative includes the metaportal 12 obtaining some back office information via an interface of a portal and other information from the same back office system by direct connection to the back office system. This may be a useful technique. A number of scenarios, or combinations of scenarios, may be used temporarily or employed as permanent solutions based on the efficiency and costs of the solution.

While several embodiments have been provided in the present disclosure, it should be understood that the data loading tool may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be in communication with one another. Other examples of changes, substitutions, and alterations are readily ascertainable by on skilled in the art and could be made without departing from the spirit and scope disclosed herein.

What is claimed is:

1. A system for accessing a plurality of portals, the system comprising:

a user interface;

a back office system maintaining information;

a first portal stored on a first non-transitory computer readable storage medium and executable by a first processor to access at least a portion of the back office system, the first portal having a first portal user interface configured to enable a user to access at least a portion of the information maintained by the back office system;

a second portal stored on a second non-transitory computer readable storage medium and executable by a second processor to provide second portal user interface coupled to one or more back office systems; and a metaportal stored on a third non-transitory computer readable storage medium and executable by a third processor to be in communication with the first portal user interface and the second portal user interface and the user interface, the metaportal including a collection component executable to collect, via a non-complex coupling with the first portal through the first portal user interface and a non-complex coupling with the second portal through the second portal user interface and without integration with the first and the second portals, at least a portion of the first and second portal user interfaces of the first and second portals for display via the user interface, the metaportal executable to combine duplicated elements from the first portal and the second portal into a single element for presentation to the user, the metaportal executable to enable the user to access at least a portion of the information maintained by the back office system via the user interface.

2. The system of claim 1, wherein the second portal is coupled to access the back office system.

3. The system of claim 1, further comprising a second back office system and wherein the second portal is coupled to access at least a portion of the second back office system.

4. The system of claim 1, wherein the non-complex coupling of the collection component configures the collection component to gather hyper-text markup language information from at least the portions of the first and second portal user interfaces of the first and second portals.

5. The system of claim 1, wherein the metaportal collection of portions of the first portal user interface of the first portal provides the user with access the user's billing information on the back office system via the user interface.

6. The system of claim 1, wherein the metaportal caches portions of the first and second portal user interfaces for display via the user interface.

7. The system of claim 1, wherein back office system is further defined as including at least one of an ordering system and a service options system, wherein the metaportal collection of portions of the first portal user interface of the first portal provides the user with a corresponding one of an order interface to place an order and a service modification interface to modify user service options.

8. The system of claim 1, wherein the metaportal displays via the user interface the entire first portal user interface.

9. The system of claim 8, further comprising a second back office system coupled to the user interface such that the user interface displays information from at least a portion of the second back office system.

10. A system for accessing back office system information, comprising:

a metaportal stored on a first non-transitory computer readable storage medium and executable by a first processor, the metaportal including a user interface coupled, via a complex coupling, to access a first back office system and executable to display at least a portion of information maintained by the first back office system;

a portal stored on a second non-transitory computer readable storage medium executable by a second processor to be coupled to access a second back office system and having a portal user interface to enable access to at least a portion of information maintained by the second back office system; and the metaportal further including a collection component in communication with the portal user interface and the user interface, the collection component executable to collect, via a non-complex coupling with the portal through the portal user interface and without integration with the portal, at least a portion of the portal user interface of the portal, the metaportal executable to combine duplicated elements from the metaportal and the portal into a single element, the metaportal user interface further executable to display at least the portion of the portal user interface collected by the collection component with duplicated elements from the metaportal and portal presented as the single element to further enable access to at least the portion of information maintained by the second back office system.

11. The system of claim 10, wherein at least the portion of the portal user interface includes portions sufficient to enable a user to manage, via the portal, at least portions of the information maintained by the second back office system.

12. The system of claim 10, wherein the first and second back office systems maintain at least one of a billing system, an ordering system and a service options system.

13. The system of claim 10, wherein the collection component only collects a textual information from the portal user interface for display by the user interface.

14. The system of claim 10, wherein the collection component only collects a user data from a hyper-text markup language of the portal user interface and display the user data in the user interface.

15. The system of claim 10, wherein the collection of at least the portion of the portal user interface is further defined as clipping a portion of a content of the portal user interface.

16. The system of claim 10, wherein the collection of at least the portion of the portal user interface is further defined as clipping a complete content of the portal user interface.

17. The system of claim 10, wherein the collection of at least the portion of the portal user interface is further defined as clipping a text portion of the portal user interface.

18. A method of migrating portals, comprising:

maintaining data in a first back office system and a second back office system;

retrieving, to a first portal, data from the first back office system and retrieving, to a second portal, data from the second back office system wherein the first portal comprises a first portal interface and the second portal comprises a second portal interface;

providing, in the first portal user interface of the first portal, at least a portion of the data retrieved from the first back office system;

providing, in the second portal user interface of the second portal, at least a portion of the data retrieved from the second back office system;

collecting, in a collection component of a metaportal, via a non-complex coupling with the first and second portals through the first and second portal user interfaces and without integration with the first and second portals, provided portions of the first and second portal user interfaces;

manipulating the collected portions of the first and second portal user interfaces to generate a single integrated user interface, wherein manipulating the collected displayed portions of the first and second portal user interfaces to generate a single integrated user interface comprises combining elements that are duplicated in the first and second portal user interfaces into a single element that is presented in the single integrated user interface; and presenting the single integrated user interface in at least a portion of a user interface of the metaportal.

19. The method of claim 18, further comprising:

connecting, via a complex coupling, the metaportal user interface to the first back office system to enable display of at least portions of the data from the first back office system in the metaportal user interface; and decoupling the first portal from the first back office system.

20. The method of claim 18, further comprising:

retrieving, to the metaportal via a complex coupling, data from the second back office system; and displaying, in the metaportal user interface of the metaportal, at least a portion of the data retrieved from the second back office system.

21. The method of claim 18, wherein collecting the provided portions of the first and second portal user interfaces further comprises at least one of retrieving hyper-text markup language portions of the first and second portal user interfaces and collecting only non-graphical portions of the first and second user interfaces.

22. The system of claim 1, wherein the metaportal is further executable to remove extraneous information.

23. The system of claim 1, wherein the metaportal is further executable to provide a uniform look and feel for the user interface that is separate from the first and second portal interfaces.

24. The system of claim 1, wherein the metaportal is further executable to provide a uniform authentication to the first and second portals.

25. The system of claim 1, wherein the metaportal is further executable to retrieve at least one of only textual information and only user data from the first and second portal user interfaces.

26. The method of claim 18, wherein manipulating the collected displayed portions of the first and second portal user interfaces to generate a single integrated user interface further comprises at least one of removing extraneous information and adding information.

27. The method of claim 18, wherein manipulating the collected displayed portions of the first and second portal user interfaces to generate a single integrated user interface further comprises providing a uniform look and feel to the single integrated user interface that is separate from the first and second portal user interfaces.

* * * * *